United States Patent
Baba et al.

(10) Patent No.: US 6,799,204 B1
(45) Date of Patent: Sep. 28, 2004

(54) METHOD AND SYSTEM FOR DYNAMIC REGISTRATION AND CONFIGURATION PROTOCOL

(75) Inventors: Shinichi Baba, Morristown, NJ (US); Subir Das, Parsippany, NJ (US); Anthony McAuley, Glen Ridge, NJ (US); Yasuro Shobatake, Morristown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 784 days.

(21) Appl. No.: 09/693,015

(22) Filed: Oct. 20, 2000

Related U.S. Application Data
(60) Provisional application No. 60/161,220, filed on Oct. 22, 1999.

(51) Int. Cl.[7] .............................................. G06F 15/16
(52) U.S. Cl. ...................................... 709/220; 709/221
(58) Field of Search ................................ 709/220–222, 709/250, 249; 370/350, 351; 455/432.1, 418–420

(56) References Cited

U.S. PATENT DOCUMENTS

| | | | | |
|---|---|---|---|---|
| 5,159,592 A | | 10/1992 | Perkins ...................... 370/85.7 |
| 5,442,633 A | | 8/1995 | Perkins et al. ............. 370/94.1 |
| 5,918,016 A | * | 6/1999 | Brewer et al. ............. 709/220 |
| 5,958,018 A | * | 9/1999 | Eng et al. ................... 709/246 |
| 5,978,854 A | * | 11/1999 | Fujimori et al. ............ 709/245 |
| 5,983,090 A | | 11/1999 | Aoki ......................... 455/403 |
| 6,032,197 A | * | 2/2000 | Birdwell et al. ............ 709/247 |
| 6,052,725 A | * | 4/2000 | McCann et al. ............ 709/227 |
| 6,061,739 A | * | 5/2000 | Reed et al. ................. 709/222 |
| 6,219,715 B1 | * | 4/2001 | Ohno et al. ................. 709/245 |
| 6,249,813 B1 | * | 6/2001 | Campion et al. ........... 709/220 |
| 6,278,877 B1 | * | 8/2001 | Brederveld et al. ......... 455/434 |
| 6,374,108 B1 | * | 4/2002 | Jakobsen et al. ......... 455/432.1 |
| 6,424,654 B1 | * | 7/2002 | Daizo ......................... 370/401 |
| 6,434,134 B1 | * | 8/2002 | La Porta et al. ............ 370/338 |
| 6,466,694 B2 | * | 10/2002 | Leung et al. ............... 709/202 |
| 6,473,413 B1 | * | 10/2002 | Chiou et al. ............... 370/331 |
| 6,535,493 B1 | * | 3/2003 | Lee et al. ................... 370/329 |
| 6,542,491 B1 | * | 4/2003 | Tari et al. ................... 370/338 |
| 6,601,093 B1 | * | 7/2003 | Peters ......................... 709/220 |
| 6,697,862 B1 | * | 2/2004 | Beser et al. ................ 709/221 |

OTHER PUBLICATIONS

Postel, J.; "Assigned Network Numbers—Request for Comments (RFC) 0717"; Jul. 1976.*
Plummer, D.; "An Ethernet Address Resolution Protocol—Request for Comments (RFC) 00826"; Nov. 1982.*
Reynolds, J.; "Assigned Numbers—Request for Comments (RFC) 1700", pp. 1163–164; Oct. 1994.*
Droms, R.; "Dymanic Host Configuration Protocol (DHCP)—Request for Comments (RFC) 2131"; Mar. 1997.*
Droms, R.; "Procedure for Defining New DHCP Options—Request for Comments (RFC) 2489"; Jan. 1999.*

* cited by examiner

Primary Examiner—Marc D. Thompson
(74) Attorney, Agent, or Firm—Joseph Giordano; James W. Falk (57) ABSTRACT

The Dynamic Registration and Configuration Protocol (DRCP) provides a framework for registering and passing configuration information to roaming mobile hosts. DRCP is compatible with DHCP can switch to using DHCP protocol if only DHCP servers are present in the network. Most importantly, DRCP allows rapid configuration by moving address consistency checking from the critical path. Other novel features of DRCP allow: a) clients to know when to get a new address independent of the layer-2 access technology, b) efficient use of scarce wireless bandwidth, c) clients to be routers, d) dynamic addition or deletion of address pools to any DRCP node, and e) message exchange without broadcast.

4 Claims, 4 Drawing Sheets

FIG. 1

PRIOR ART

METHOD AND SYSTEM FOR DYNAMIC REGISTRATION AND CONFIGURATION PROTOCOL

RELATED UNITED STATES APPLICATIONS/ CLAIM OF PRIORITY

This patent application is a non-provisional counterpart to, and claims the benefit of priority of provisional application serial No. 60/161,220, which was filed on Oct. 22, 1999.

TECHNICAL FIELD OF THE INVENTION

The present invention relates generally to networks and more specifically to a method, system, apparatus and product for providing dynamic registration and configuration of mobile clients in end to end wireless/wireline Internet Protocol (IP) networks.

BACKGROUND

Various Transmission Control Protocol/Internet Protocol (TCP/IP)_registration and configuration network protocols exist today. Popular protocols include: Mobile IP (MIP) and Dynamic Host Configuration Protocols (DHCP). Although its primary function is providing location services and continuous connectivity to roaming users, Mobile IP also provides for flexible registration and configuration capabilities. The Mobile IP client sends registration information to a Foreign Agent to which the client is connected. The Foreign Agent can then configure the client, after getting authorization from the user's Home Agent. While Mobile IP is a solution to manage device mobility throughout the global Internet, its costs can be too high for many applications.

For example, Mobile IP provides networks transparency above the IP layer. This transparency is achieved at a relatively high cost (e.g., triangular routing) compared to simply getting a new care-of-address. In many cases, however, this transparency is not needed, e.g., for web browsing.

The Dynamic Host Configuration Protocol (DHCP) provides a well-tested and widely-deployed framework for passing configuration information to network hosts. By means of dynamic allocation of IP addresses, DHCP allows for leasing of network addresses, recovery of network addresses upon expiration of those leases, as well as subsequent re-use or reallocation of network addresses. DHCP, however, was designed for hosts on a fixed LAN, not for mobile hosts roaming among commercial wireless networks.

Rapid configuration (milliseconds rather than seconds) is necessary for most roaming users. The DHCP specification says a client should, and most implementations do, perform the widely known Address Resolution Protocol (ARP) check after it receives an assigned address before the assigned address is used by the client. This checking by the client typically results in a long delay before communication can resume.

Other limitations of DHCP are that it: (a) has no facilities for detecting a move to a new subnet, (b) involves a large message size (parts of which are not needed), (c) requires a DHCP node to be a server or a relay agent, and not both, and (d) identifies machines (e.g., by MAC address) rather than users (e.g., by a network access identifier of the form such as user@domain). The fixed functionality limits architectural choices that might be attractive to wireless service providers, where a subnet router may act as a relay agent when a node first moves into the domain, but as a server for previously authorized nodes.

Given the foregoing, there is a need for a solution which can address the problems of the prior art and provide for rapid client registration and configuration of a roaming mobile host. The registration functionality would enable roaming mobile hosts to rapidly and automatically register their presence and their requirements with networks. The configuration functionality would enable networks to automatically configure roaming mobile hosts to the particular network characteristics. Moreover, there is a need for a solution which provides efficient use of scarce wireless bandwidth, allows mobile hosts to be routers, allows flexible proxies that can act as both relay or server and allows dynamic server and relay reconfiguration.

SUMMARY

The present invention, hereinafter referred to as the Dynamic Registration and Configuration Protocol (DRCP) is a protocol directed to solving the forgoing needs. In a basic application, DRCP, although providing some new configuration capability, has no other function except registration and configuration. In more advanced applications, DRCP provides additional functionality, including providing information about the location of a network registration, service negotiation, or mobility agent.

Our invention DRCP, is built directly on User Datagram Protocol (UDP) and IP and is a lightweight dynamic configuration protocol. DRCP provides the critical functions necessary for roaming users. For example, DRCP allows rapid configuration by moving address consistency checking from the critical path. Other features and/or advantages allow; a) clients to know when to get a new address independent of the 2-layer access technology, b) efficient use of scarce wireless bandwidth, c) clients to be routers, d) dynamic addition or deletion of address pools to any DRCP node and e) message exchange without broadcast.

Therefore, in accordance with one aspect of the present invention, there is provided, a system, method, apparatus and product for rapidly and dynamically registering and configuring a mobile client in a second network environment; said mobile client having traveled from a first network environment to said second network environment, said method comprising: providing a plurality of valid IP addresses associated with said second network environment for assignment to mobile clients; said valid IP addresses having been positively checked for availability; broadcasting a request for at least one of said plurality of valid IP addresses; monitoring said first network environment to sense movement of said mobile client from said first Network environment to said second network environment to provide a request for a valid IP address; and providing at least one of said plurality of valid IP addresses associated with said second network environment to be assigned to said mobile client.

In accordance with a second aspect of the present invention, there is provided a data structure representing a signaling message having a small footprint to provide efficient use of scarce wireless bandwidth, These and other aspects, features and advantages of the present invention will become better understood with regard to the following description, appended claims, and accompanying drawings.

BRIEF DESCRIPTION OF THE DRAWING(S)

Turning now to the drawings.

DETAILED DESCRIPTION OF THE PRESENT INVENTION

Referring more specifically to the drawings, for illustrative purposes the present invention is embodied in the system configuration, method of operation and product or computer-readable medium such as floppy disks, conventional hard disks, CD-ROMS, Flash ROMS, nonvolatile ROM, RAM and any other equivalent computer memory device, generally shown in FIGS. 1–9. It will be appreciated that the system, method of operation and product may vary as to the details of its configuration and operation without departing from the basic concepts as disclosed herein.

Architecture

Figure 1:
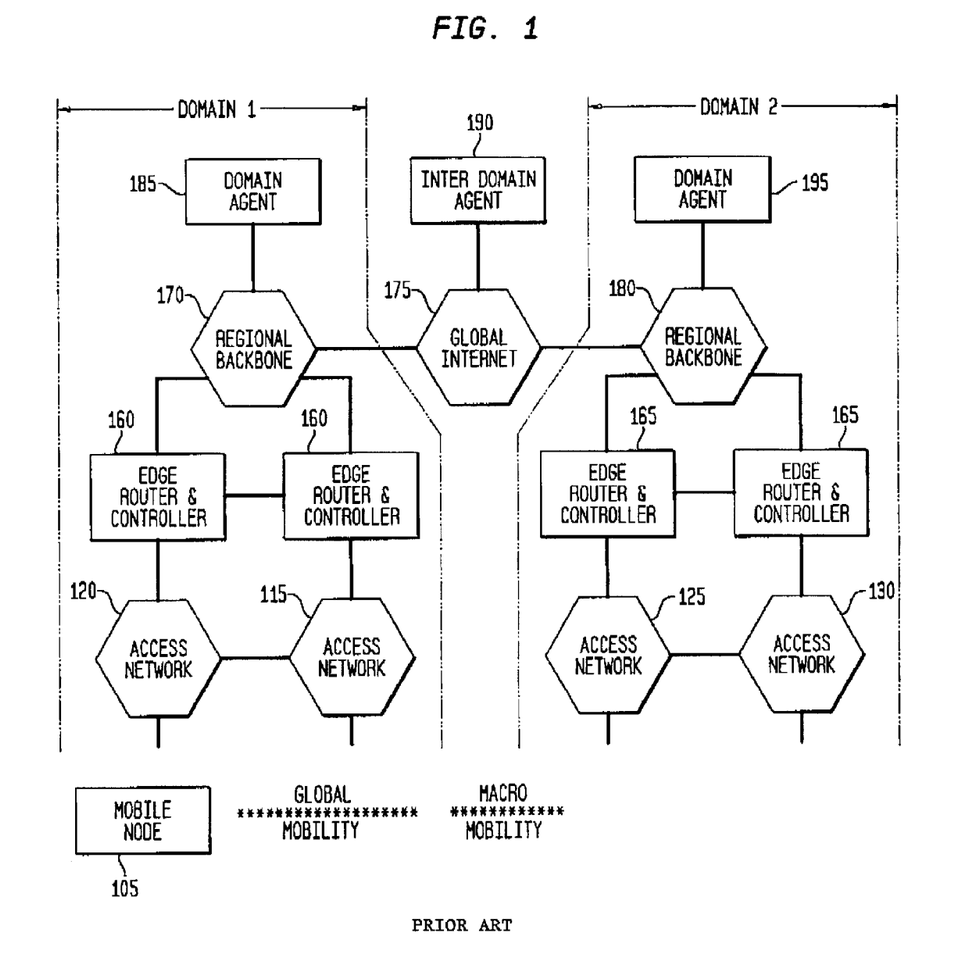
FIG. 1 is a high level functional architecture of an IP-based network having mobile nodes in communication with various wired or wireless access networks.
Figure 2:
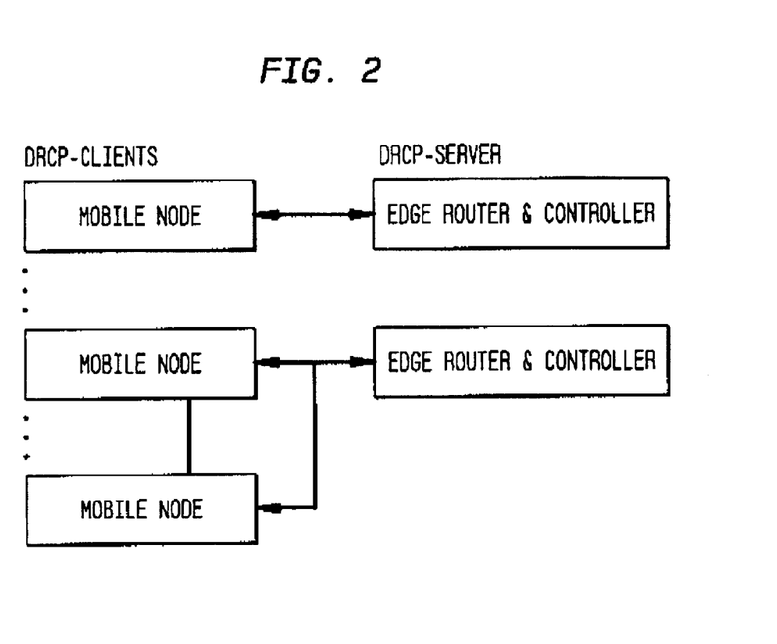
FIG. 2 is an embodiment of a DRCP client-server model in accordance with the teachings of the present invention.

FIG. 1 is a general high level network architecture diagram of an IP based network of the prior art and that is suitable for implementing DRCP in accordance with our invention. As shown, the net work comprises a plurality of components in communication with each other, the components comprising; at least one mobile client 105, access networks 115–130, edge routers and controllers 160, 165, regional backbones 270, 180, domain agents 185, 195, an inter domain agent 190, and the global Internet 175. Each of the forgoing components is well known in the art and accordingly will not be discussed. FIG. 1 is meant to be a very general functional diagram. A base station could be located within the access networks, thus being a Layer 2 base station, or located within the edge router, thus being an IP base station. Moreover, the domain and Inter-Domain agents, which perform functions such as Authentication, Authorization and Accounting (AAA) are shown as separate single boxes; however each could be implemented as multiple nodes (possibly in a hierarchical structure).

Figure 3:
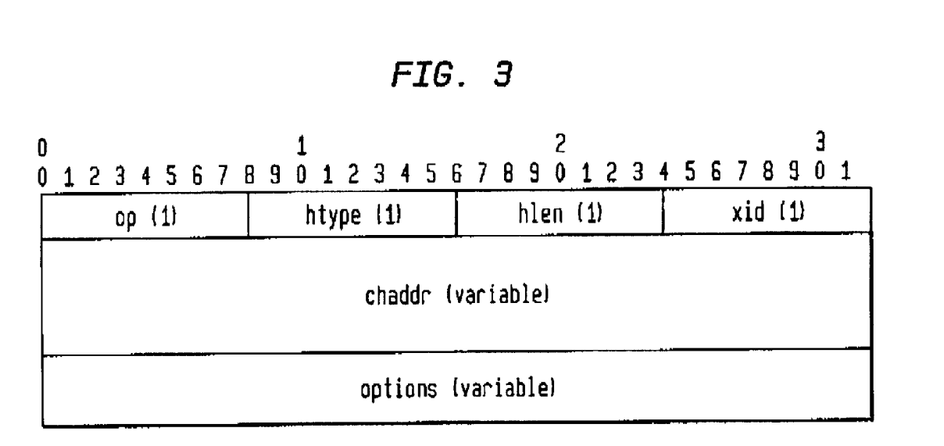
FIG. 3 is one embodiment of a DRCP client message format in a accordance with the teachings of the present invention.

Our invention, DRCP, is based on a client-server model. FIG. 3 shows how the DRCP client and DRCP server may map onto the architecture of FIG. 1. The DRCP client-server model is similar to the DHCP client-server model in most respects. There are, however, some significant differences.

First unlike DHCP, in accordance with our invention, any DRCP node (including the client) can be a router or host. Second, unlike DHCP, all DRCP nodes run the same program. The only thing that makes a DRCP node or end host a server is that it has configuration information, including an address pool and other configuration parameters to be used on an interface. A DRCP server must configure its own interface using the configuration information for that subnet. This allows for more flexible and robust operation.

DRCP Message Formats

DRCP messages have the same basic semantics as those used in DHCP. For example, a DHCPOFFER message has the same basic functions (and name) as a DRCP_OFFER message. New DRCP messages are needed, however, in order to minimize message size thereby providing use of scarce wireless bandwidth. Like DHCP, DRCP uses UDP as its transport protocol. All DRCP messages are sent in UDP/IP packets to special DRCP ports and, are preferably, 32-bit aligned. There are two types of DRCP signaling messages running on three different DRCP ports:

a) All messages from a DRCP client are sent to the DRCP_SERVER_PORT port.

b) All messages from a DRCP server are sent to the DRCP_CLIENT_PORT port, except the DRCP_ADVERTISMENT.

c) DRCP_ADVERTISEMENT messages from a DRCP server are sent to the DRCP_ADVERSEMENT_PORT on three DRCP clients.

What follows is a list and description of typical DRCP client messages sent by a DRCP client.

DRCP_DISCOVER: Registration message sent by a DRCP-client on its local subnet to request a new address and other configuration parameters. While a DHCPDISCOVER message must be broadcast, a DRCP_DISCOVER message may be broadcast or unicast depending on whether the client knows the address of a DRCP server (e.g., from a DRCP-ADVERTISEMENT).

DRCP-REQUEST: Registration message sent by a DRCP-client on its local subnet to request extending the lease on an address, a lease being the period of time an address is valid, as in DHCP.

DRCP_INFORM: Registration message sent by a DRCP-client on its local subnet to request new configuration parameters. This could be used, for example, if the client already has an externally configured network address.

DRCP_DECLINE: Registration message sent by a DRCP-client on its local subnet to request a different address, either because the one assigned is not acceptable (e.g., it is already in use by another client) or because the client has moved to a new subnet.

DRCP_RELEASE: De-registration message sent by a DRCP-client on its local subnet to relinquish a network address and cancel remaining lease.

DRCP_ACCEPT: Registration message sent by a DRCP-client on its local subnet in response to an OFFER from servers. The client accepts offered parameters from one server and implicitly declining offers from all others.

What follows is a list and description of typical DRCP server messages sent by a DRCP server.

DRCP_OFFER: Configuration message sent back to client on the same subnet where the DRCP server node received a DRCP_DISCOVER message.

DRCP_ACK: Configuration message broadcast by a Server on its local subnet in response to a DRCP_ACCEPT.

DRCP_NAK: Message sent to a client or clients (may be broadcast) to tell them not to use an address or other service they requested. (e.g., when a client is using a wrong address).

DRCP_ADVERTISEMENT: Server periodically broadcasts (or unicast in response to a client using an incorrect address) the network information (such as Server IP address or Network address). Listening to this, client can understand the subnet change.

All DRCP messages from the DRCP client (to the DRCP_SERVER_PORT) have the same general format (size shown in braces) as shown in FIG. 3: The various fields are:

| FIELD | OCTETS | DESCRIPTION |
| --- | --- | --- |
| op | 1 | Message OpCode. |
| htype | 1 | Hardware address type. |
| hlen | 1 | Hardware address length in bytes. |
| xid | 1 | Transaction ID. |
| chaddr | var. | Client hardware address (e.g 16 bytes for 802.X) |
| options | var. | Optional parameters field. |

Figure 4:
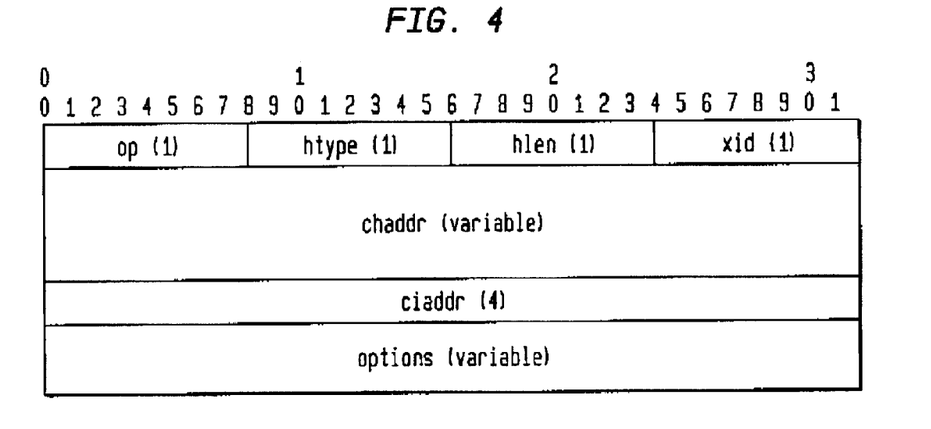
FIG. 4 is one embodiment of a DRCP server message format in a accordance with the teachings of the present invention.

All DRCP server messages from the DRCP server (to the DRCP_CLIENT_PORT) have the same general format (except a DRCP_ADVERTISEMENT) as shown in FIG. 4. The fields are the same as those of the DRCP client message format except that it includes an additional field: ciaddr.

| FIELD | OCTETS | DESCRIPTION |
| --- | --- | --- |
| ciaddr | 4 | Client IP address |

Figure 5:
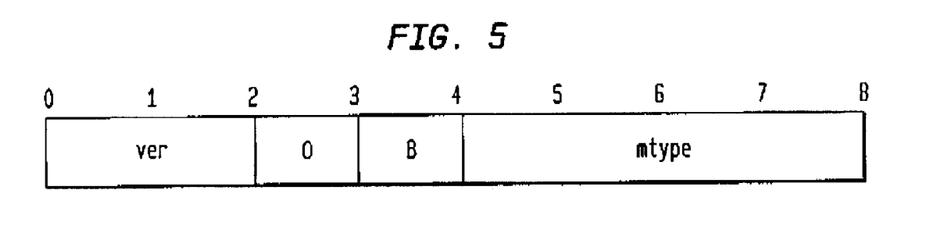
FIG. 5 is one embodiment of an OPCODE field of a DRCP message in accordance with the teachings of the present invention.
Figure 6:
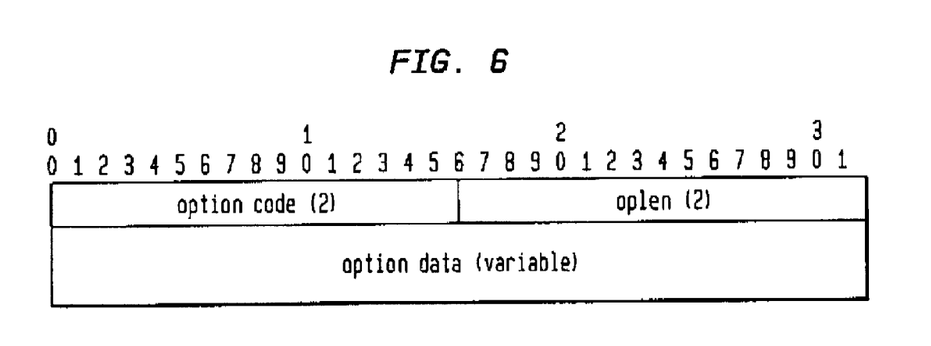
FIG. 6 is one embodiment of an OPTION field of a DRCP message in accordance with the teachings of the present invention.

What follows is a description of the content of the various field shown in FIGS. 3 and 4:

The opcode consists of version number (VER), message type (mtype) and broadcast (B) flag, as shown in FIG. 5 and the option field consists of the option code and oplen, as shown in FIG. 6.

Possible values for Message types include:

| Message Value | Message Type |
| --- | --- |
| 0 0 0 1 | DRCP_DISCOVER |
| 0 0 1 0 | DRCP_REQUEST |
| 0 0 1 1 | DRCP_INFORM |
| 0 1 0 0 | DRCP_ACCEPT |
| 0 1 0 1 | DRCP_DECLINE |
| 0 1 1 1 | DRCP_RELEASE |
| 1 0 0 1 | DRCP_OFFER |
| 1 0 1 0 | DRCP_ACK |
| 1 0 1 1 | DRCP_NAK |
| 1 1 1 1 | DRCP_ADVERTISEMENT |

Htype: see Address Resolution Protocol (ARP)_section in "Assigned Network Numbers", Internet Engineering Task Force RFC (0717). For example: Htype='1' means it is a 10 Mb ethernet.

Hlen: Length of chaddr field in bytes. For example Hlen is set to '6' for 10 mbps ethernet.

Xid: A random number chosen by the client. It is used by the client and server to associate messages and responses between a client and a server.

Ciaddr: The IP address assigned to a client by a server.

Options: All information, other than what is in the common header, must be included as options. All options have a common 4 byte header as shown in FIG. 6.

Method of Operation

A node is initially assumed to only know its interfaces which are running the DRCP-client and its security associations. If there are multiple interfaces, each interface may be configured in a different way. For example, one interface may be configured by DRCP, another using a locally stored address, and a third as a DHCP-client. After boot-up, however, any interface configured as a DRCP interface listens to messages on a specified port designated a DRCP_ADVERTISMENT_PORT. During any message exchange a transaction id is used between the client and server and they must match for a given exchange.

If a DRCP interface does not have a local address pool it becomes a DRCP client. The client first broadcasts a DRCP_DISCOVER message (similar to a DHCPDISCOVER message) to a designated port on the DRCP server, i.e. DRCP_SERVER_PORT. It then listens for a response. If it gets no response after a predetermined time-out period, i.e., DRCP_RETX_TIMEOUT, it resends the DISCOVER message. This process repeats for up to a predetermined number of retransmissions, i.e. DRCP_RETX_MAX.

If an unconfigured DRCP client receives a DRCP_ADVERTISEMENT message (on the DRCP_ADVERTISEMENT_PORT), then it will change to a unicast state, so the next DRCP_DISCOVER message will be unicast to the source address of the DRCP_ADVERTISEMENT message.

If the DRCP client receives an OFFER message, it can immediately configure its interface with that address. There is no requirement to do ARP checking (as in DHCP). After getting an address the DRCP client may periodically send out DRCP_REQUEST messages to renew the lease. These message are retransmitted until acknowledged by a DHCP_ACK message.

If a configured DRCP client receives a DRCP_ADVERTISEMENT message (on the DRCP_ADVERTISEMENT_PORT), then it will check if it can still use the same IP address. If it cannot use the same IP address, then the client must unicast a new DRCP_DISCOVER message in order to get a new address. This helps to detect the subnet change. It happens only when a client moves to a new subnet.

If a DRCP interface has a local configuration information (including an address pool) for that interface, then it becomes a DRCP server. The DRCP server must first use the first address from the address pool to configure its own interface. It can then use the rest of the address pool to allocate individual addresses directly to DRCP clients on the same subnet as that interface.

The DRCP server may send periodic DRCP_ADVERTISEMENT messages (on the DRCP_ADVERTISMENT_PORT) every DRCP_ADVERTISMENT_PERIOD time.

The server listens for a DHCP_DISCOVER broadcast or unicast message on its designated port, i.e., DRCP_SERVER_PORT. If it gets a DHCP_DISCOVER message, then the DRCP server can immediately send a DRCP_OFFER message with valid IP address and other configuration parameters from its configuration information. The DRCP_OFFER message will be resent for a predetermined time period, every DRCP_OFFER_PERIOD for up to DRCP_SERVER_MAX retransmissions, or until it receives a DRCP_ACCEPT or DRCP_DECLINE message from a DRCP client.

Figure 7:
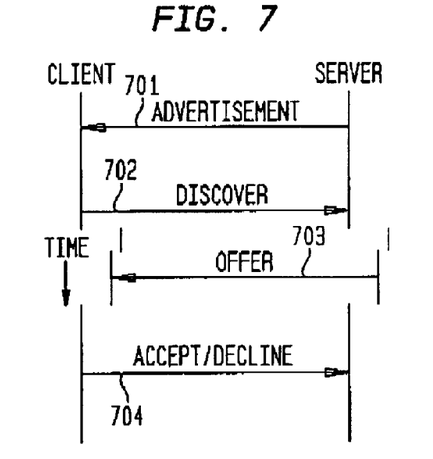
FIG. 7 illustrates a preferred DRCP signaling and message flow sequence when a DRCP client moves into a new administrative domain and/or subnet.

FIG. 7 depicts the signaling and merge flow when a DRCP client moves into a new administrative domain and/or subnet At 701, the DRCP server initiates periodic ADVERTISEMENT messages. Upon receiving the ADVERTISEMENT message, at 702 the DRCP client transmits and retransmits the DISCOVER message until it gets an OFFER message or the time expires. At 703, the DRCP server transmits and retransmits the OFFER message until it gets an ACCEPT or DECLINE message, at 704, or the timer expires. Notably, a key difference between DRCP and DHCP is that there is no ACK message from the DRCP server to the DRCP client. A second key difference is that configuration can be used as soon as the OFFER message is received by the DRCP client since (duplicate address detection is handled in the server and thus is checked by the server prior to any negotiation).

Figure 8:
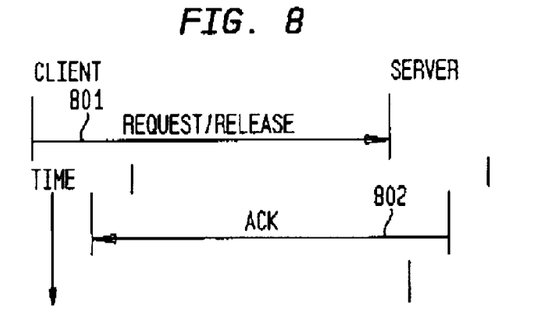
FIG. 8 illustrates a preferred DRCP signaling and message flow sequence when a DRCP extending a lease within an administrative domain.

FIG. 8 depicts the signaling and message flow when a DRCP client renews or releases an existing lease. If a DRCP client wants to renew or release its lease, then there will be a flow of DRCP messages as follows: At 801, a DRCP client sends a message requesting a renewal or a release of an existing lease. At 802, a DRCP server sends an ACK message in response to the REQUEST/RELEASE message.

Figure 9:
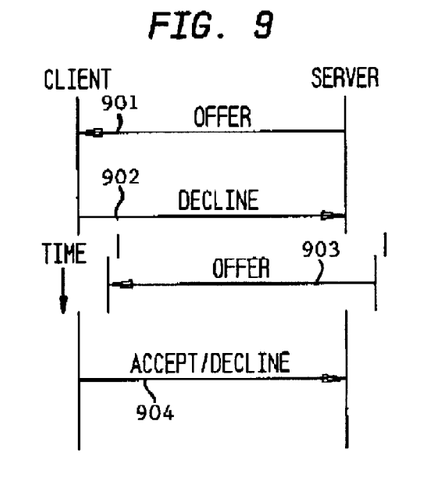
FIG. 9 illustrates a preferred DRCP signaling and message flow sequence when a DRCP client re-negotiating an OFFER message sent by a DRCP server.

FIG. 9 depicts the signaling and message flow when a DRCP client negotiates its offer message. At 901, a DRCP client server sends an OFFER message to a DRCP client. At 902, the DRCP client sends a DECLINE message to the DRCP server. At 903, upon receiving the DECLINE message the DRCP server can either do nothing or it can send a new OFFER message to the DRCP client. At 904, in response to the new OFFER message, the DRCP client can either decline the OFFER message again and send another DECLINE message or it can accept the OFFER message and send an ACCEPT message to the DRCP server.

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. In an IP based network, a method for rapidly and dynamically registering and configuring a mobile client in a new network domain, said mobile client having traveled from a prior network domain to said new network domain and said network domains including edge routers and controllers comprising servers and domain agents, said servers having a server port and said mobile clients having a client port and an advertisement port and said servers having a pool of IP addresses and configuration parameters, said method comprising the steps of:

a server performing an Address Resolution Protocol (ARP) check on said server's IP address pool to provide a pool of valid IP addresses;

a mobile client sending a request for an IP address to said server;

said server receiving the request message from said client at a server port; and said server sending a valid IP address from said pool of valid IP addresses at said server to a client port of said mobile client, whereby said mobile client does not need to perform itself ARP checking of said valid IP address.

2. The method in accordance with claim 1 wherein all messages from said sender to said mobile client except advertisement messages are sent to said mobile client port and advertisement messages from said sender are sent to said mobile client advertisement port.

3. The method in accordance with claim 2 wherein said messages from a mobile client to a server further include:

a request message requesting extension of the period of time an address is assigned;

an inform message requesting new configuration parameters;

a decline message requesting a different address;

a release message to relinquish a network address; and an accept address sent in response to an offer from a server.

4. The method in accordance with claim 3 wherein said messages from a server to a mobile client further include:

an offer message and an acknowledgement message sent to the mobile client port; and advertisement messages sent periodically to the mobile client advertisement port, the advertisement messages containing network information.

\* \* \* \* \*

UNITED STATES PATENT AND TRADEMARK OFFICE
CERTIFICATE OF CORRECTION

PATENT NO. : 6,799,204 B1
DATED : September 28, 2004
INVENTOR(S) : Shinichi Baba et al.

It is certified that error appears in the above-identified patent and that said Letters Patent is hereby corrected as shown below:

Title page,
Item [73], Assignee, after "Telcordia Technologies, Inc, Piscataway, NJ (US)" insert
-- Toshiba America Research, Inc., Piscataway, NJ (US) --.

Signed and Sealed this

Twenty-fifth Day of October, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,799,204 B1 | Page 1 of 1 |
| APPLICATION NO. | : 09/693015 | |
| DATED | : September 28, 2004 | |
| INVENTOR(S) | : Baba et al. | |

It is certified that error appears in the above-identified patent and that said Letters Patent is hereby corrected as shown below:

On the title page, item (56), References Cited under "OTHER PUBLICATIONS", in Column 2, Line 6, delete "1163" and insert -- 1, 163 --, therefor.

On the title page, item (56), References Cited under "OTHER PUBLICATIONS", in Column 2, Line 7, delete ""Dymanic" and insert -- "Dynamic --, therefor.

In the Specification

Column 2, Line 31, delete "allow;" and insert -- allow: --, therefor.

Column 2, Line 57, delete "bandwidth," and insert -- bandwidth. --, therefor.

Column 3, Line 44, delete "comprising;" and insert -- comprising: --, therefor.

Column 3, Line 63, delete "First" and insert -- First, --, therefor.

Column 4, Line 61, delete "requested." and insert -- requested --, therefor.

Column 5, Line 3, delete "FIG. 3:" and insert -- FIG. 3. --, therefor.

Column 5, Line 28, delete "FIGS. 3 and 4:" and insert -- FIGS. 3 and 4. --, therefor.

Column 6, Line 60, delete "subnet" and insert -- subnet. --, therefor.

Signed and Sealed this
Twenty-fourth Day of February, 2015

Michelle K. Lee
*Deputy Director of the United States Patent and Trademark Office*